F. L. H. SIMS.
CLAMP.
APPLICATION FILED JULY 18, 1918.
1,320,425.
Patented Nov. 4, 1919.
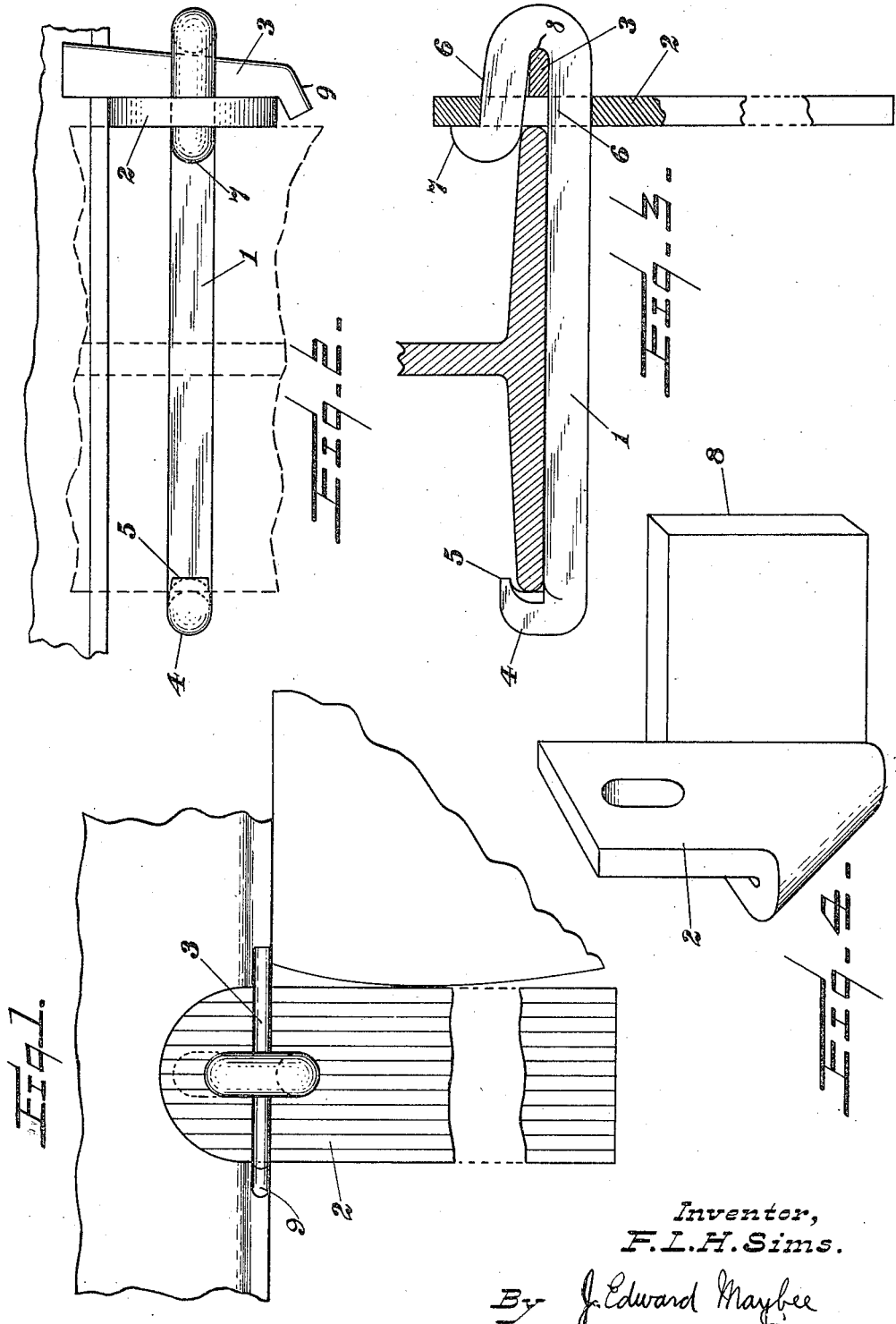
Inventor,
F.L.H.Sims.
By J. Edward Maybee
Atty.

UNITED STATES PATENT OFFICE.

FREDERICK LINDLEY HUNT SIMS, OF TORONTO, ONTARIO, CANADA, ASSIGNOR TO SIMS IMPROVED RAIL ANCHOR COMPANY LIMITED, OF TORONTO, CANADA, A CORPORATION OF ONTARIO.

CLAMP.

1,320,425.  Specification of Letters Patent.  Patented Nov. 4, 1919.

Application filed July 18, 1918. Serial No. 245,566.

*To all whom it may concern:*

Be it known that I, FREDERICK L. H. SIMS, of the city of Toronto, in the county of York, Province of Ontario, Canada, have invented certain new and useful Improvements in Clamps, of which the following is a specification.

The object of my invention is to devise a clamp of light weight which may readily be formed of wrought metal, which may be quickly and securely attached to any flanged structural metal member, and which is particularly adapted to resist strains directed against it lengthwise of the member.

I attain my object by means of the constructions hereinafter described and illustrated in the accompanying drawings in which—

Figure 1 is an end elevation of my improved clamp connected to a flanged structural metal member;

Fig. 2 a plan view of the clamp with part of a structural metal member shown in dotted lines;

Fig. 3 a rear elevation of the clamp, partly in section, and connected with a structural metal member; and Fig. 4 a modified form of the washer shown in Figs. 1, 2 and 3 of the drawings.

In the drawings like numerals of reference indicate corresponding parts in the different figures.

The clamp comprises three parts, a cross bar 1, a washer 2, and a wedge 3. One end of the cross bar has a hook 4 formed thereon adapted to engage the flange of a structural metal member as shown. The hook is preferably provided with a lip 5 adapted to overhang the flange to hold the cross bar in position during the attachment of the device. This lip is preferably very short, not more at most than one quarter of the lateral extension of the hook. By using as short a lip as possible, I render it unnecessary to provide any large amount of lost motion in the jaws 6 located at the other end of the cross bar, and also make it possible to form the hook in one operation in the forging machine.

At the other end of the bar the jaws 6 are formed by bending the cross bar back upon itself. These jaws are adapted to embrace the edge of the flange opposite to that engaged by the hook 4, and the throat 8 of the jaws, when the cross bar is in place, is sufficiently spaced from the adjacent flange edge to permit of the washer 2 being forced over the jaws and the wedge 3 driven between the jaws and bearing against the throat thereof and the washer.

In practice I proportion the parts so that the distance between the throats of the jaws is greater than the width of the flange the device is to be engaged with, so that the device may be positioned by first engaging the deeper jaws 6 with one edge of the flange until the lip 5 will clear the other edge of the flange. The bar 1 is then brought into contact with the flange and moved laterally in the direction of the deeper jaws to engage the lip 5 above the flange as shown.

The washer may be a metal plate of any form and is provided with a slot shaped to fit over the jaws 6. These jaws normally slightly diverge and the length of the slot is slightly less than the greatest spread of the diverging jaws so that when the washer is driven over the jaws the latter are clamped against the opposite sides of the flange, giving them a very secure grip thereon. Usually the washer will be forced on by driving the wedge 3 between the jaws to engage the throat and the washer.

While for most purposes a sufficient hold is obtained by simply clamping the jaws on the flange as described, for heavy work the key may be over driven, crushing the washer against the flange and putting a very heavy tensile strain on the cross bar.

For many purposes the washer will be of considerable length and pressure will be applied thereto at the end remote from the jaws, as, for example, when the device is used as a rail anchor. Leverage is thus exerted tending to twist the jaws in a plane at right angles to the flange to which they are applied, greatly increasing their grip, so that no slip will be possible except by the breakage of some of the parts, which, however, are specially proportioned to prevent that possibility under any normal conditions. The metal of which the jaws are formed is preferably rectangular in cross section and the width is small, preferably being no greater than the depth. When the wedge is driven home, the end 9 may be bent in as shown in Fig. 2. This is easily effected as the wedge is in alinement with the flange and the part of the washer under the wedge is thus effectively supported as on an anvil.

For certain purposes the washer may be formed of a plate bent up to the form shown in Fig. 4 in which a strap or abutment 8 is formed at right angles to that part of the washer which fits over the jaws 6. The wedge, being subject to none but compression strains, may be of mild steel so as to readily bend when cold, of slight pitch and moderate length, that is to say, a trifle more than the width of the washer. The cross bar itself may be narrow and of small cross section, as it merely takes tensile strain and this not very heavy. The jaws also are most effective in gripping the flange when twisted by leverage of the washer, if made comparatively narrow, as hereinbefore described. The washer itself may be made of comparatively light material as in use the strains thereon are in the direction of its width. The whole device therefore can be made of a minimum weight while a maximum strength and security of grip is obtained.

This device is applicable for various purposes, such, for example, as steps of a step ladder in which the longitudinal members are light rolled angle bars, shelf supports in warehouses, steps for electric light poles, anti-slip hoisting clamps, and also as rail anchors for railway purposes.

What I claim as my invention is:—

1. In a clamp, the combination of a cross bar having a hook at one end adapted to engage one edge of a flange of a structural metal member; jaws at the opposite end of the cross bar adapted to embrace the other edge of the flange and formed by a return bend of the cross bar; a washer provided with a slot adapted to fit over the jaws; and a wedge adapted to be driven between said jaws, to engage the throat thereof and the washer to force the latter toward the edge of the flange.

2. In a clamp, the combination of a cross bar having a hook at one end adapted to engage one edge of a flange of a structural metal member; slightly diverging jaws at the opposite end of the cross bar adapted to embrace the other edge of the flange and formed by a return band of the cross bar; a washer provided with a slot adapted to fit over the jaws and of less length than the greatest spread of the diverging jaws; and a wedge adapted to be driven between said jaws, to engage the throat thereof and the washer to force the latter toward the edge of the flange and clamp the jaws against the opposite sides of the flange.

3. In a clamp, the combination of a cross bar having a hook at one end adapted to engage one edge of a flange of a structural metal member; slightly diverging jaws at the opposite end of the cross bar adapted to embrace the other edge of the flange and formed by a return bend of the cross bar; a washer provided with a slot adapted to fit over the jaws and of less length than the greatest spread of the diverging jaws; and a wedge adapted to be driven between said jaws to engage the throat thereof and the washer to force the latter toward the edge of the flange and clamp the jaws against the opposite sides of the flange, the hook and jaws being proportioned so that the washer as well as the jaws is in engagement with the flange when the wedge is driven home.

4. In a clamp, the combination of a cross bar engageable at one end with one edge of a flange of a structural metal member; narrow jaws integral with the other end of the cross bar adapted to engage opposite sides of the other edge of the flange; and means for forcing said jaws into engagement with the flange, said means being extended substantially at right angles to the length of the cross bar to form a lever arm.

5. In a clamp, the combination of a cross bar engageable at one end with one edge of a flange of a structural metal member; narrow jaws integral with the other end of the cross bar adapted to engage opposite sides of the other edge of the flange; means for forcing said jaws into engagement with the flange, said means being extended substantially at right angles to the length of the cross bar to form a lever arm; and means for drawing the end of the cross bar against the first mentioned edge of the flange.

6. In a clamp, the combination of a cross bar having a hook at one end adapted to engage one edge of a flange of a structural metal member; slightly diverging jaws at the opposite end of the cross bar adapted to embrace the other edge of the flange and formed by a return bend of the cross bar; a washer provided with a slot adapted to fit over the jaws and of less length than the greatest spread of the diverging jaws whereby the washer when forced over the jaws will clamp the latter against opposite sides of the flange.

7. In a clamp, the combination of a cross bar having a hook at one end adapted to engage one edge of a flange of a structural metal member and provided with a short lip adapted to fit over the edge, and a longer hook formed at its other end exactly opposed to the first mentioned hook, the distance between the jaws of the hooks being greater than the width of the flange by more than the length of the lip aforesaid, a washer embracing the jaws of the deeper hook; and a wedge adapted to be driven between the jaws of said deeper hook to engage the throat thereof and the washer to force the latter toward the edge of the flange.

8. In a clamp, the combination of a cross bar having a hook at one end adapted to engage one edge of a flange of a structural metal member; jaws at the opposite end of the cross bar adapted to embrace the other edge of the flange and formed by a return bend of the cross bar; a washer provided with a slot adapted to fit over the jaws; and a wedge adapted to be driven between said jaws in alinement with the flange to engage the throat and the washer to force the washer toward the edge of the flange, the end of the wedge being adapted to project past the washer and bent toward the flange.

Signed at Toronto, Canada, this twelfth day of July, 1918.

FREDERICK LINDLEY HUNT SIMS.